United States Patent
Fukuchi et al.

(10) Patent No.: US 8,011,174 B2
(45) Date of Patent: Sep. 6, 2011

(54) APPARATUS FOR DIAGNOSING EXHAUST GAS PURIFYING DEVICE

(75) Inventors: Eisaku Fukuchi, Mito (JP); Akihito Numata, Hitachiohmiya (JP); Kenichi Kotabe, Mito (JP); Heikichi Kamoshida, Hitachinaka (JP); Kenji Mizushima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 526 days.

(21) Appl. No.: 12/261,695

(22) Filed: Oct. 30, 2008

(65) Prior Publication Data

US 2009/0145110 A1    Jun. 11, 2009

(30) Foreign Application Priority Data

Dec. 6, 2007   (JP) ................. 2007-316421

(51) Int. Cl.
*F01N 3/00* (2006.01)
(52) U.S. Cl. .......................... 60/277; 60/299
(58) Field of Classification Search ............... 60/277, 60/299
See application file for complete search history.

(56) References Cited

U.S. PATENT DOCUMENTS

| | | | | |
|---|---|---|---|---|
| 6,823,658 B2* | 11/2004 | Kuroda et al. | .................. | 60/277 |
| 7,254,474 B2* | 8/2007 | Iihoshi et al. | .................. | 701/109 |
| 7,389,637 B2* | 6/2008 | Takaku et al. | .................. | 60/277 |
| 7,752,837 B2* | 7/2010 | Iihoshi et al. | .................. | 60/277 |
| 2005/0016160 A1* | 1/2005 | Takaku et al. | .................. | 60/277 |

FOREIGN PATENT DOCUMENTS

JP    5-171924    7/1993

* cited by examiner

*Primary Examiner* — Thomas Denion
*Assistant Examiner* — Patrick Maines
(74) *Attorney, Agent, or Firm* — Crowell & Moring LLP

(57) ABSTRACT

In an apparatus for diagnosing an exhaust gas purifying device, a catalyst deterioration level detector 104 detects the deterioration level of a catalyst from a relationship between a catalyst-upstream air-fuel-ratio detector 101 and a catalyst-downstream air-fuel-ratio detector 102. A catalyst-deterioration-level correction section 111 corrects the catalyst deterioration level detected by the catalyst deterioration level detector 104 based on a falling response ratio representing the ratio between a falling response index of the catalyst-upstream air-fuel-ratio detector 101 and a falling response index of the catalyst-downstream air-fuel-ratio detector 102 or based on a rising response ratio representing the ratio between a rising response index of the catalyst-upstream air-fuel-ratio detector 101 and a rising response index of the catalyst-downstream air-fuel-ratio detector 102. A catalyst deterioration judgment section 112 determines that the catalyst is deteriorated from information provided by the catalyst-deterioration-level correction section 111. This allows any deteriorated catalyst to be precisely detected even if an air-fuel ratio sensor downstream of the catalyst is degraded in terms of rising response.

9 Claims, 15 Drawing Sheets

FIG.3
(A) CATALYST-UPSTREAM AIR-FUEL-RATIO-SENSOR OUTPUT VOLTAGE
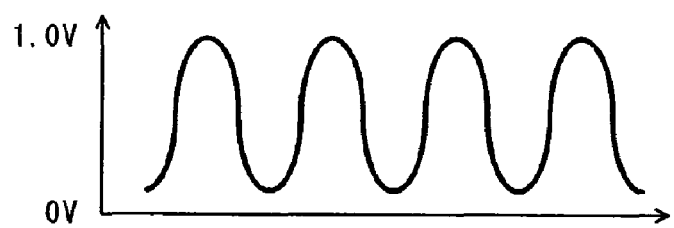
(B) CATALYST-DOWNSTREAM AIR-FUEL-RATIO-SENSOR OUTPUT VOLTAGE
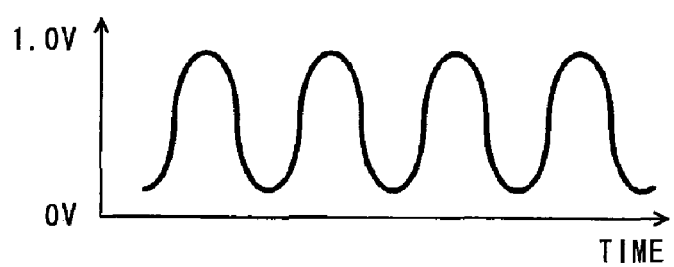

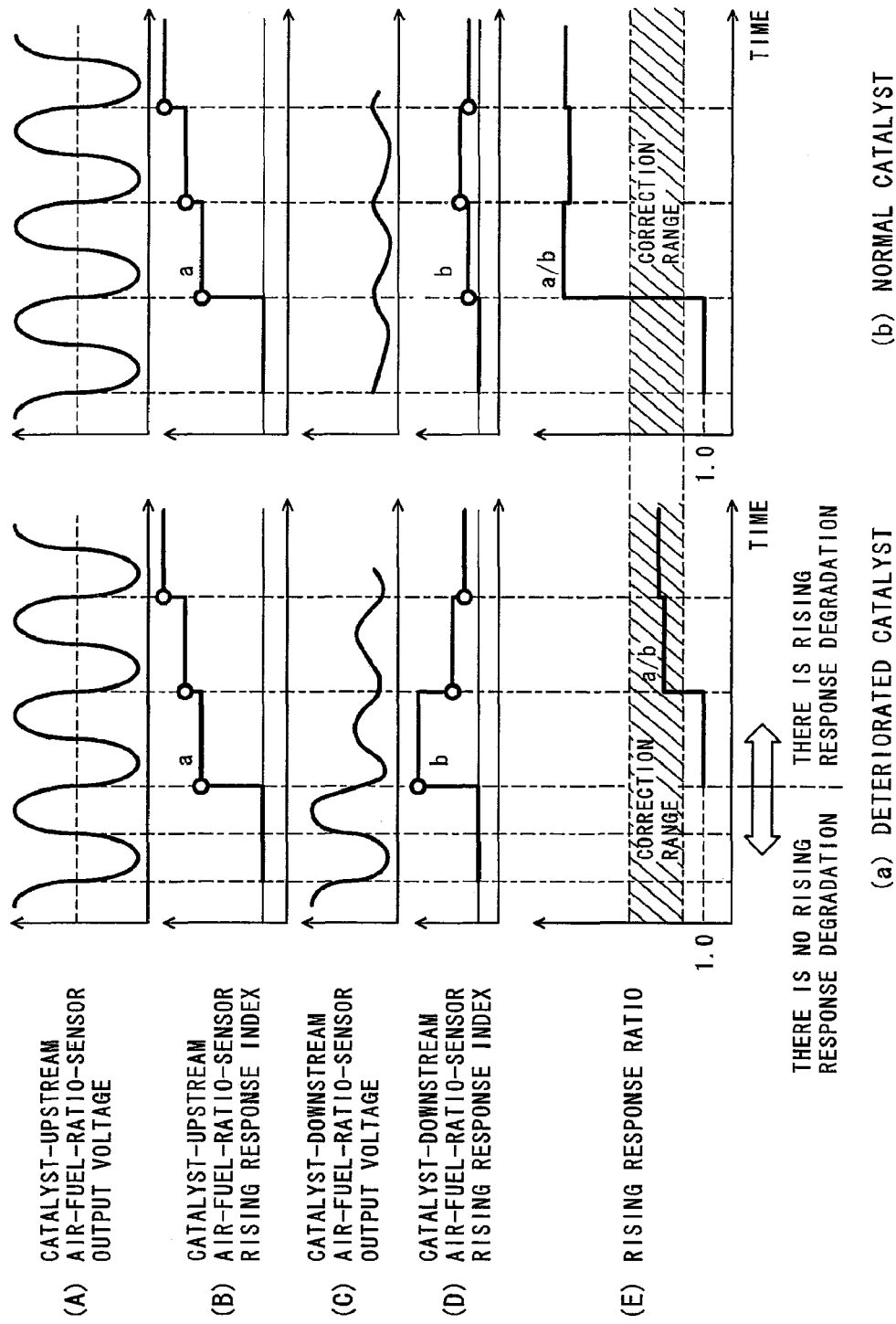

| CATALYST-DOWNSTREAM AIR-FUEL-RATIO-SENSOR FALLING TIME CONSTANT | 0ms | 500ms | 1000ms | 1500ms | 200ms |
|---|---|---|---|---|---|
| NEW CATALYST — FALLING RESPONSE RATIO | 1400 | 450 | 250 | 340 | 370 |
| NEW CATALYST — CATALYST DETERIORATION INDEX | 0.0039 | 0.0234 | 0.0195 | 0.0156 | 0.0156 |
| DETERIORATED CATALYST — FALLING RESPONSE RATIO | 9 | 20 | 55 | 70 | 100 |
| DETERIORATED CATALYST — CATALYST DETERIORATION INDEX | 0.0039 | 0.47 | 0.31 | 0.24 | 0.20 |

| FALLING RESPONSE RATIO | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|
| FALLING RESPONSE CORRECTION VALUE | 1 | 1 | 1.2 | 1.4 | 1.5 | 1.7 | 1.9 | 2.1 | 2.4 | 2.6 | 2.9 | 1 | 1 | 1 | 1 | 1 |

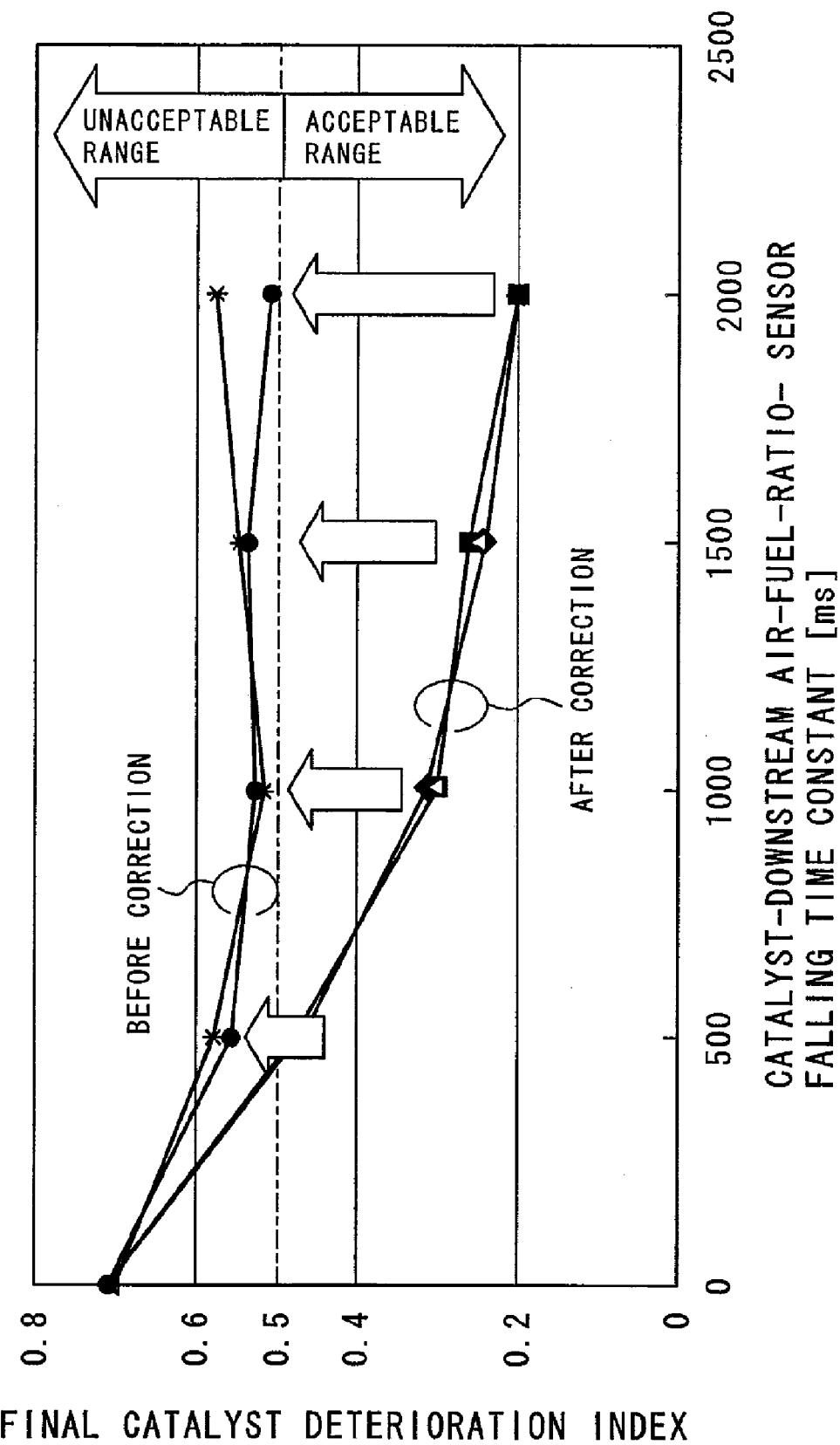

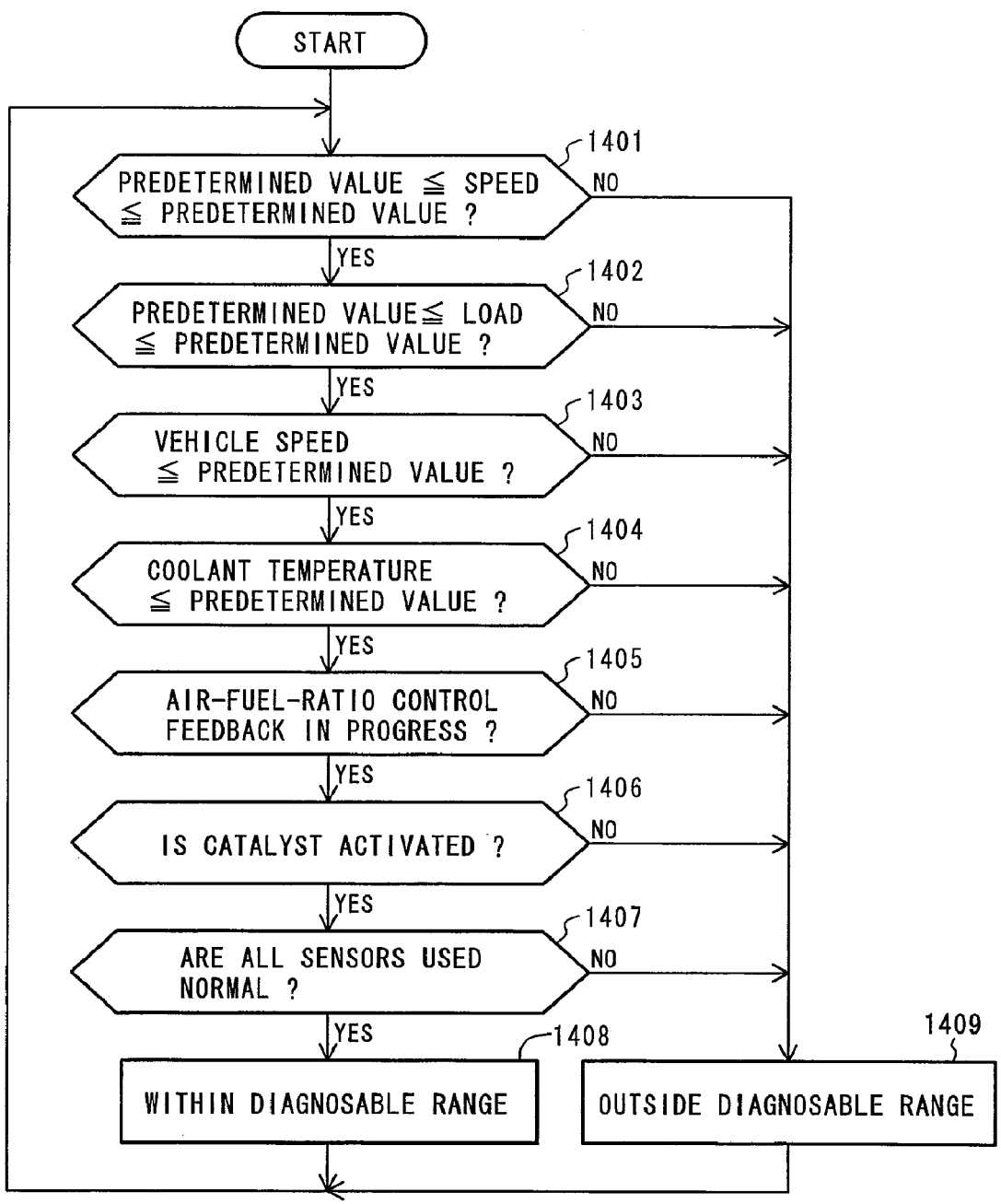

APPARATUS FOR DIAGNOSING EXHAUST GAS PURIFYING DEVICE

BACKGROUND OF THE INVENTION

1. Field of the Invention

The present invention relates in general to apparatus for diagnosing exhaust gas purifying devices and more particularly to an apparatus capable of diagnosing a deterioration of a catalyst even when an air-fuel ratio detector on the downstream side of the catalyst is degraded.

2. Description of Related Art

Many of known apparatus for diagnosing exhaust gas purifying devices detect a deteriorated condition of the catalyst based on the relation between information detected by an air-fuel ratio detector disposed on the upstream side of the catalyst and that detected by an air-fuel ratio detector disposed on the downstream side of the catalyst. One known apparatus, for example, uses information detected by an air-fuel ratio detector disposed upstream of the catalyst and that detected by an air-fuel ratio detector disposed downstream of the catalyst to calculate a ratio between a cross-correlation function and an auto-correlation function and detects a deteriorated condition of the catalyst based on that ratio (see, for example, JP-A-5-171924). Some other known apparatus uses as a catalyst deterioration index a period ratio between the information detected by the air-fuel ratio detector disposed upstream of the catalyst and that detected by the air-fuel ratio detector disposed downstream of the catalyst or a ratio of the numbers of fluctuations occurring during a given period of time.

SUMMARY OF THE INVENTION

The apparatus disclosed in JP-A-5-171924, however, poses the following problem. If the air-fuel ratio detector disposed downstream of the catalyst is degraded in terms of response, the air-fuel ratio detected downstream of the catalyst deviates from that detected upstream of the catalyst. Accordingly, despite the deteriorated condition of the catalyst, the catalyst deterioration index fails to provide a value suggesting the deteriorated condition, and the apparatus becomes unable to determine that the deteriorated catalyst is in a deteriorated state. The apparatus for diagnosing the exhaust gas purifying device may be prohibited from diagnosing if the detector used is faulty; however, the response deterioration of the air-fuel ratio detector of interest, which is disposed downstream of the catalyst, is such a deterioration as the driver should not necessarily be notified of, though the detector is actually in a deteriorated state. As a result, the apparatus may not be able to determine that the catalyst is deteriorated though the exhaust gas purifying device can still be diagnosed.

It is an object of the present invention to provide an apparatus for diagnosing an exhaust gas purifying device, capable of diagnosing a deteriorated catalyst even when the air-fuel ratio detector downstream of the catalyst is degraded in terms of response.

(1) To achieve the foregoing object, there is provided an apparatus for diagnosing an exhaust gas purifying device used in an internal combustion engine having an air-fuel ratio control unit that detects the air-fuel ratio of an exhaust gas of the internal combustion engine and regulates a fuel injection amount so as to maintain the air-fuel ratio of the exhaust gas at a predetermined value, the apparatus comprising:

a catalyst-upstream air-fuel-ratio detection means disposed upstream of a catalyst;

a catalyst-downstream air-fuel-ratio detection means disposed downstream of the catalyst; and a catalyst-deterioration-level detection means for detecting a catalyst deterioration level from a relationship between the catalyst-upstream air-fuel-ratio detection means and the catalyst-downstream air-fuel-ratio detection means; the apparatus further comprising:

a catalyst-deterioration-level correction means for correcting the catalyst deterioration level detected by the catalyst-deterioration-level detection means based on a falling response ratio representing the ratio between a falling response index of the catalyst-upstream air-fuel-ratio detection means and a falling response index of the catalyst-downstream air-fuel-ratio detection means or based on a rising response ratio representing the ratio between a rising response index of the catalyst-upstream air-fuel-ratio detection means and a rising response index of the catalyst-downstream air-fuel-ratio detection means; and a catalyst deterioration judgment means for determining that the catalyst is deteriorated based on information provided by the catalyst-deterioration-level correction means.

Through the foregoing arrangements, a diagnosis of a deteriorated catalyst can be made even when the catalyst-downstream air-fuel-ratio detection means is degraded in terms of response.

(2) In accordance with the above aspect (1) of the present invention, preferably, the apparatus further comprises: a catalyst-upstream air-fuel-ratio falling-response-index detection means for detecting the falling response index of the catalyst-upstream air-fuel-ratio detection means;

a catalyst-downstream air-fuel-ratio falling-response-index detection means for detecting the falling response index of the catalyst-downstream air-fuel-ratio detection means;

an air-fuel-ratio falling-response-ratio detection means for calculating the ratio between the falling response index detected by the catalyst-upstream air-fuel-ratio falling-response-index detection means and the falling response index detected by the catalyst-downstream air-fuel-ratio falling-response-index detection means;

a catalyst-upstream air-fuel-ratio rising-response-index detection means for detecting the rising response index of the catalyst-upstream air-fuel-ratio detection means;

a catalyst-downstream air-fuel-ratio rising-response-index detection means for detecting the rising response index of the catalyst-downstream air-fuel-ratio detection means; and an air-fuel-ratio rising-response-ratio detection means for calculating the ratio between the rising response index detected by the catalyst-upstream air-fuel-ratio rising-response-index detection means and the rising response index detected by the catalyst-downstream air-fuel-ratio rising-response-index detection means.

(3) In accordance with the above aspect (1) of the present invention, preferably, the catalyst deterioration level detection means assumes a ratio between a cross-correlation function and an auto-correlation function of the catalyst-upstream air-fuel-ratio detection means and the catalyst-downstream air-fuel-ratio detection means to be a catalyst deterioration index.

(4) In accordance with the above aspect (2) of the present invention, preferably, the catalyst-upstream air-fuel-ratio falling-response-index detection means calculates the catalyst-upstream air-fuel-ratio falling response index by differentiating air-fuel ratio information detected from the catalyst-upstream air-fuel-ratio detection means to find a differential value, squaring the differential value if the differential value is negative, and integrating the squared differential value for a predetermined period calculated from the air-fuel ratio information detected from the catalyst-upstream air-fuel-ratio detection means.

(5) In accordance with the above aspect (2) of the present invention, preferably, the catalyst-downstream air-fuel-ratio falling-response-index detection means calculates the catalyst-downstream air-fuel-ratio falling response index by differentiating air-fuel ratio information detected from the catalyst-downstream air-fuel-ratio detection means to find a differential value, squaring the differential value if the differential value is negative, and integrating the squared differential value for a predetermined period calculated from air-fuel ratio information detected from the catalyst-upstream air-fuel-ratio detection means.

(6) In accordance with the above aspect (2) of the present invention, preferably, the catalyst-upstream air-fuel-ratio rising-response-index detection means calculates the catalyst-upstream air-fuel-ratio rising response index by differentiating air-fuel ratio information detected from the catalyst-upstream air-fuel-ratio detection means to find a differential value, squaring the differential value if the differential value is positive, and integrating the squared differential value for a predetermined period calculated from the air-fuel ratio information detected from the catalyst-upstream air-fuel-ratio detection means.

(7) In accordance with the above aspect (2) of the present invention, preferably, the catalyst-downstream air-fuel-ratio rising-response-index detection means calculates the catalyst-downstream air-fuel-ratio rising response index by differentiating air-fuel ratio information detected from the catalyst-downstream air-fuel-ratio detection means to find a differential value, squaring the differential value if the differential value is positive, and integrating the squared differential value for a predetermined period calculated from air-fuel ratio information detected from the catalyst-upstream air-fuel-ratio detection means.

(8) In accordance with the above aspect (1) of the present invention, preferably, the catalyst-deterioration-level correction means calculates a falling response correction value from the falling response ratio using a describing function and calculates a final deterioration index by multiplying the catalyst deterioration index by the falling response correction value;

the catalyst-deterioration-level correction means further calculates a rising response correction value from the rising response ratio using a describing function and calculates a final deterioration index by multiplying the catalyst deterioration index by the rising response correction value; and the catalyst deterioration judgment means compares the final catalyst deterioration index with a criterion value to determine whether the catalyst is deteriorated.

(9) In accordance with the above aspect (1) of the present invention, preferably, the apparatus further comprises a catalyst diagnosis permission means for enabling a catalyst diagnosis based on various operating conditions, wherein the catalyst diagnosis permission means enables the catalyst diagnosis when the speed of the internal combustion engine falls within a predetermined range, the load of the internal combustion engine falls within a predetermined range, the vehicle speed is a predetermined value or more, the coolant temperature is a predetermined value or more, the air-fuel ratio is under feedback control, the catalyst is sufficiently activated, and all sensors and the like are normal.

In accordance with the aspects of the present invention, the catalyst can be diagnosed for deterioration even when the catalyst-downstream air-fuel-ratio detection means is degraded in terms of response.

BRIEF DESCRIPTION OF THE DRAWINGS

FIGS. 3(A) and 3(B) are diagrams for illustrating an output voltage of a catalyst-upstream air-fuel-ratio sensor and that of a catalyst-downstream air-fuel-ratio sensor when the catalyst is deteriorated with the response of the catalyst-downstream air-fuel-ratio sensor being normal.

FIGS. 10(A), 10(B), 10(C), 10(D), and 10(E) are diagrams for illustrating a rising response ratio detected by the air-fuel-ratio rising-response-ratio detector of the apparatus for diagnosing the exhaust gas purifying device according to the embodiment of the present invention.

FIG. 13 is a diagram for illustrating the result of correction made by the catalyst-deterioration-level correction section of the apparatus for diagnosing the exhaust gas purifying device according to the embodiment of the present invention.

FIG. 14 is a flowchart showing the details of the operations performed by a catalyst diagnosis permission section of the apparatus for diagnosing the exhaust gas purifying device according to the embodiment of the present invention.

DESCRIPTION OF THE PREFERRED EMBODIMENTS

The configuration and operation of an apparatus for diagnosing an exhaust gas purifying device according to an embodiment of the present invention will be described below with reference to FIGS. 1 through 16.

The configuration of an internal combustion engine apparatus, on which the apparatus for diagnosing the exhaust gas purifying device according to the embodiment of the present invention is mounted, will first be described with reference to FIG. 1.

Figure 1:
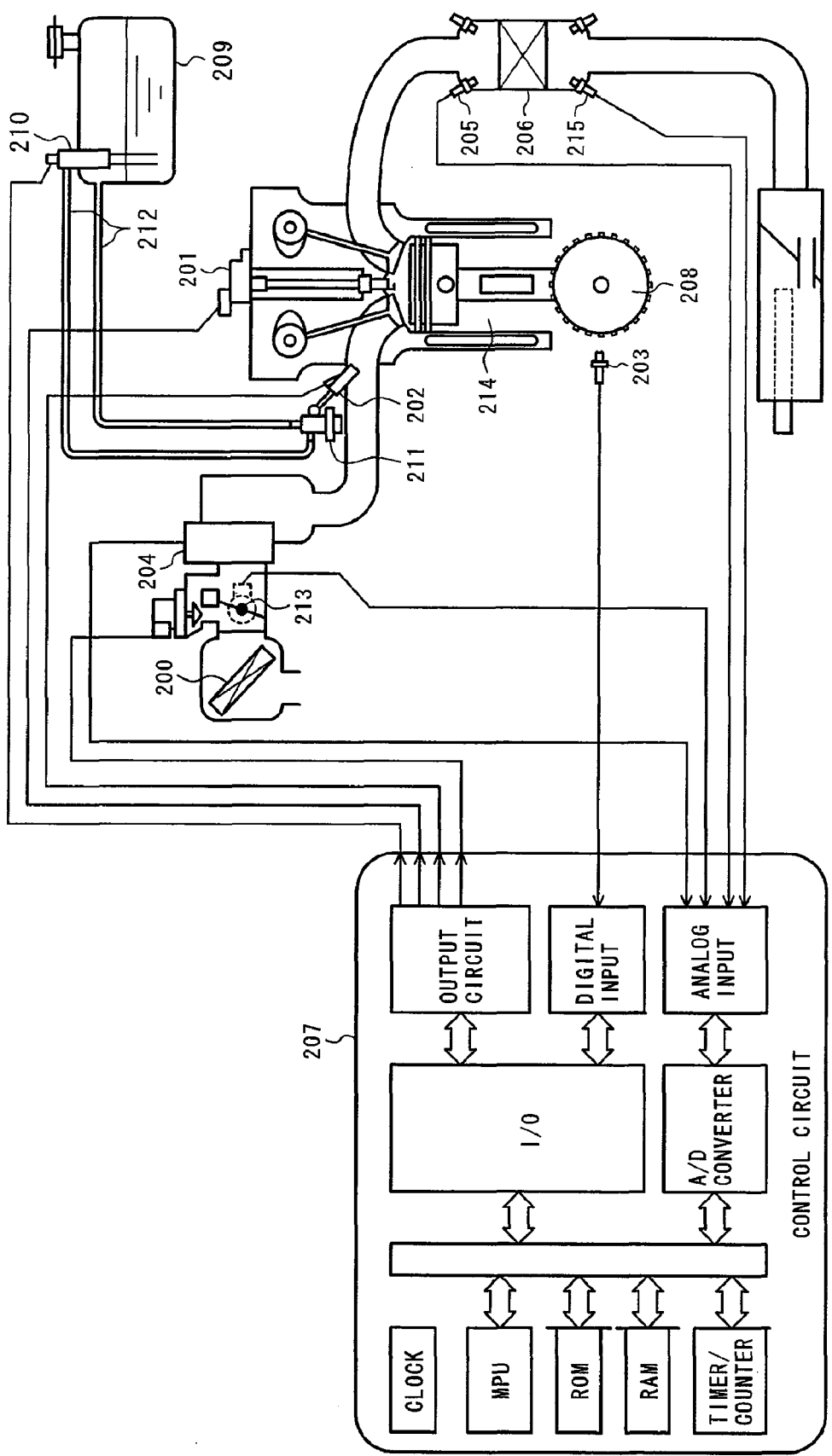
FIG. 1 is a block diagram showing the construction of an internal combustion engine apparatus, on which an apparatus for diagnosing an exhaust gas purifying device according to an embodiment of the present invention is mounted.

FIG. 1 is a block diagram showing the configuration of the internal combustion engine apparatus, on which the apparatus for diagnosing the exhaust gas purifying device according to the embodiment of the present invention is mounted.

The internal combustion engine apparatus includes an internal combustion engine, an intake apparatus, and an exhaust apparatus. The internal combustion engine includes an ignitor 201, a fuel injector 202, and a speed detector 203. Air flows from an air cleaner 200. A throttle valve 213 regulates the flow rate of the air. A flow rate detector 204 measures the regulated flow rate of the air. The air is then mixed with a fuel injected at a predetermined angle from the fuel injector 202 before supplied to each cylinder 214. The exhaust apparatus includes an air-fuel ratio sensor 205 and a three-way catalyst 206. The three-way catalyst 206 purifies an exhaust gas before the exhaust gas is discharged into the atmosphere.

An internal combustion engine control unit 207 reads an output signal Qa of the flow rate detector 204 via an analog input section and also reads a speed Ne of a ring gear or plate 208 from the speed detector 203 via a digital input section. Based on a control program stored beforehand in ROM, the internal combustion engine control unit 207 has an MPU calculate a fuel injection amount Ti and controls that fuel injection amount for the fuel injector 202 via an output circuit. The internal combustion engine control unit 207 also reads an air-fuel ratio inside the internal combustion engine from an air-fuel ratio sensor 205 disposed upstream of the catalyst 206 via the analog input section and, based on the control program stored beforehand in the ROM, has the MPU perform the air-fuel ratio feedback control for correcting the fuel injection amount Ti such that the air-fuel ratio inside the internal combustion engine achieves a stoichiometric air-fuel ratio. In addition, an air-fuel ratio sensor 215 is used to detect the air-fuel ratio downstream of the catalyst 206, and the internal combustion engine control unit 207 reads that air-fuel ratio through the analog input section. Using the output from the air-fuel ratio sensor 205 upstream of the catalyst 206 and that from the air-fuel ratio sensor 215 downstream of the catalyst 206, the internal combustion engine control unit 207 has the MPU diagnose the deterioration of the three-way catalyst 206 based on a diagnostics program stored beforehand in the ROM. The internal combustion engine control unit 207 has an internal means for diagnosing the deterioration of the catalyst, or the apparatus for diagnosing the exhaust gas purifying device.

The fuel in a fuel tank 209 is first pumped up and pressurized by a fuel pump 210. The fuel then passes through a fuel pipe 212 having a pressure regulator 211 into a fuel inlet of the fuel injector 202. Any excess fuel is returned to the fuel tank 209.

The configuration of the apparatus for diagnosing the exhaust gas purifying device according to the embodiment of the present invention will be described with reference to FIG. 2.

Figure 2:
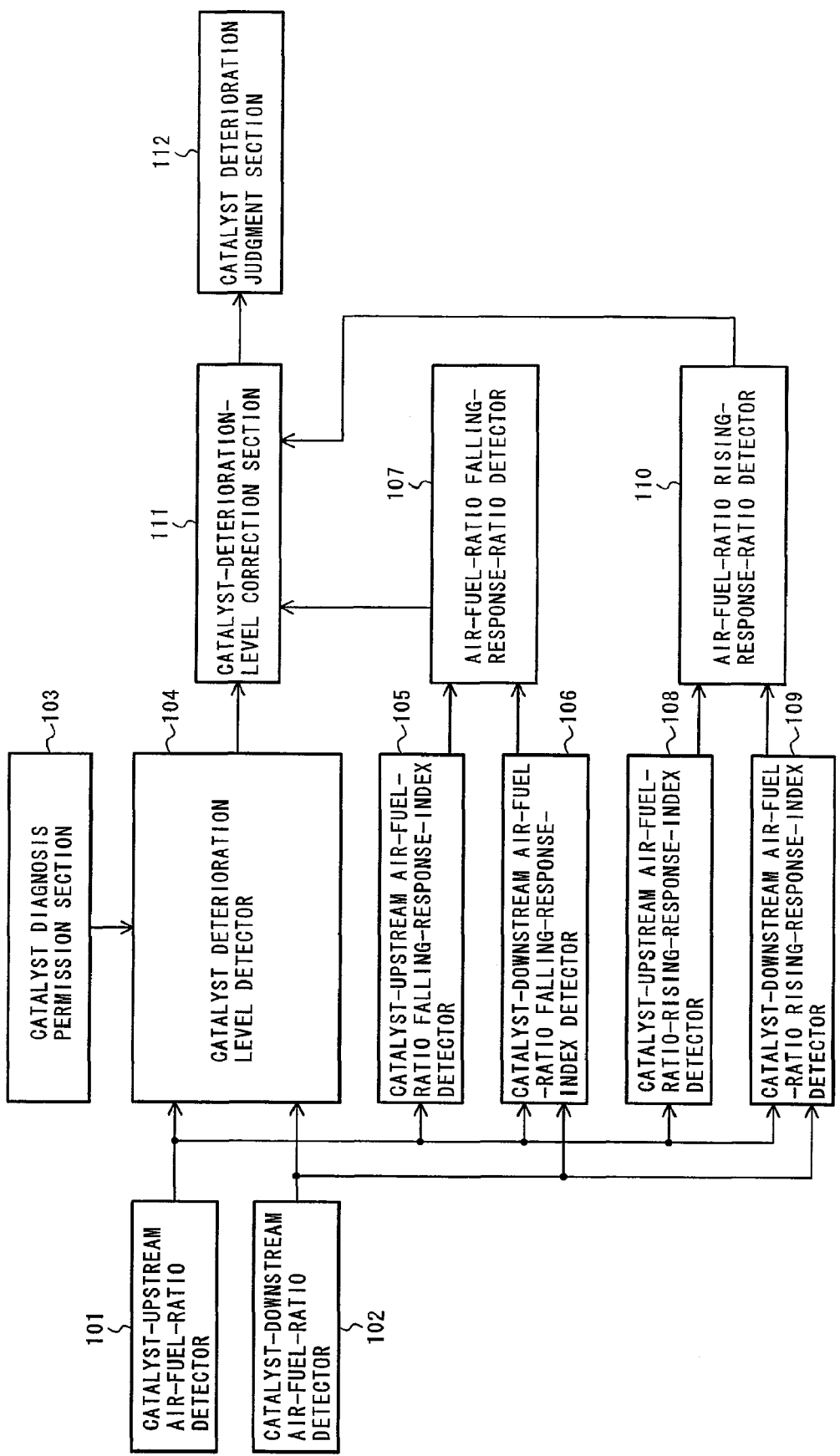
FIG. 2 is a block diagram showing the configuration of the apparatus for diagnosing the exhaust gas purifying device according to the embodiment of the present invention.
Figure 4:
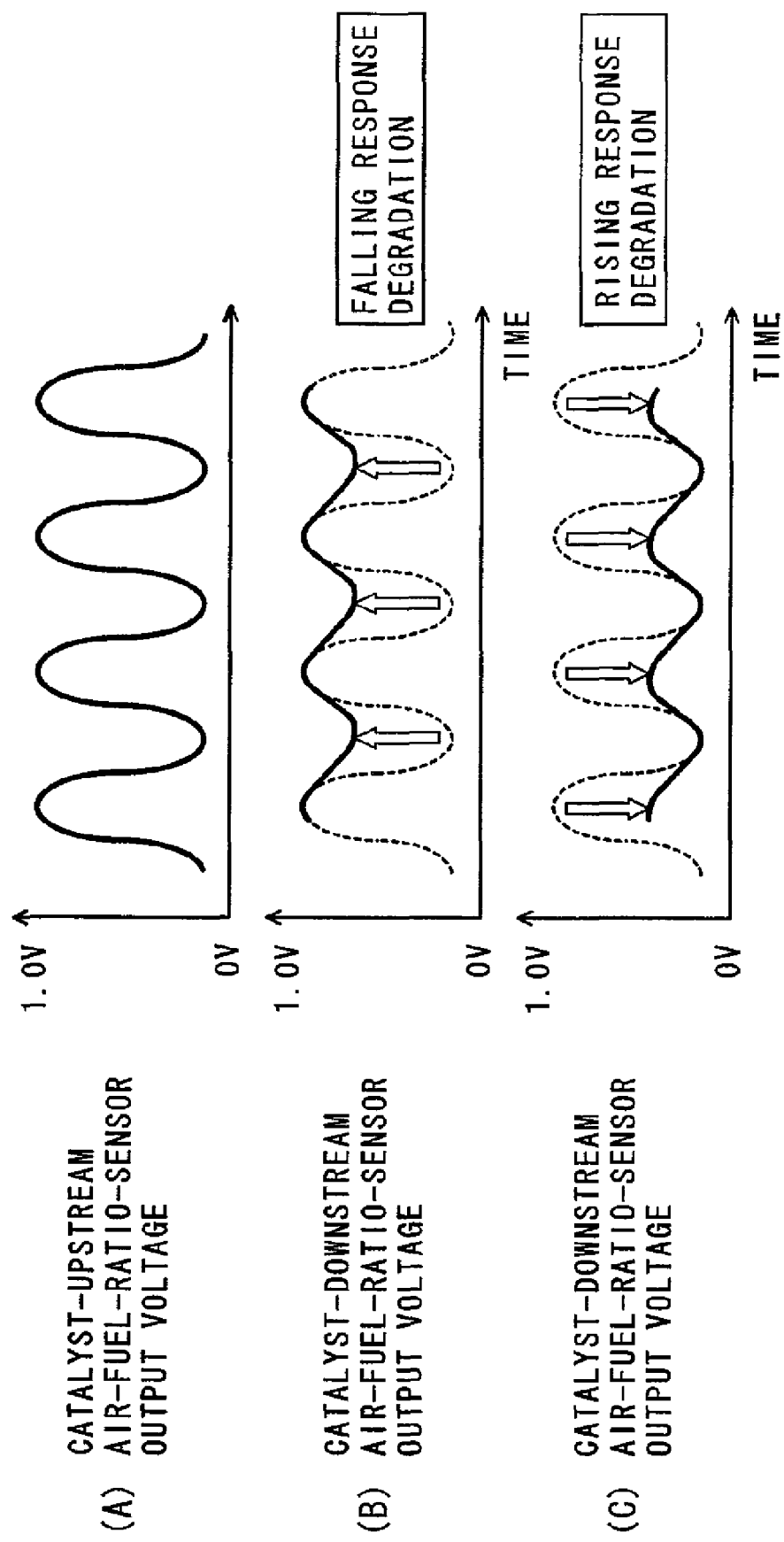
FIGS. 4(A), 4(B), and 4(C) are diagrams for illustrating the output voltage of the catalyst-upstream air-fuel-ratio sensor and that of the catalyst-downstream air-fuel-ratio sensor when the catalyst is deteriorated with the response of the catalyst-downstream air-fuel-ratio sensor being degraded.
Figure 5:
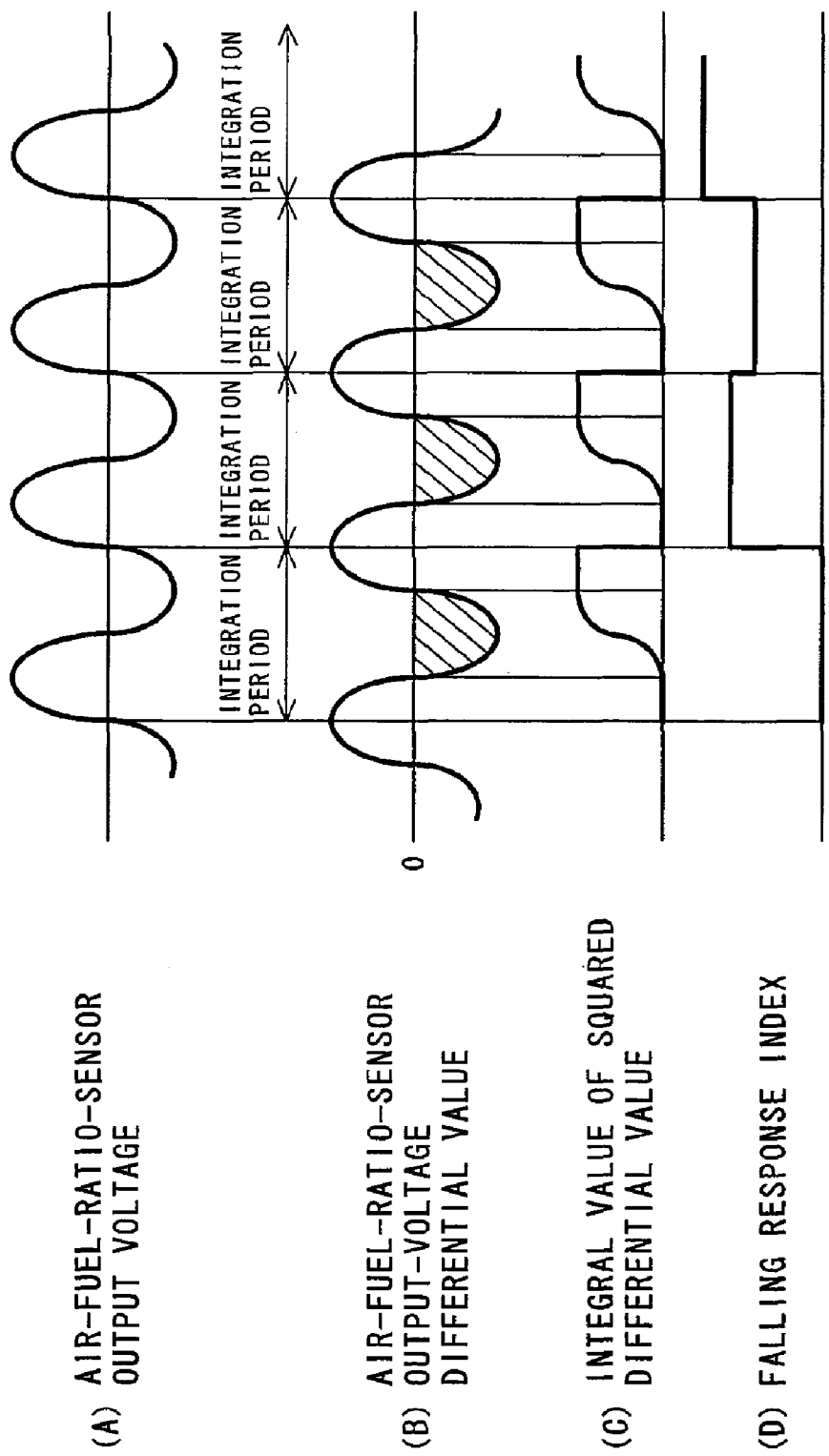
FIGS. 5(A), 5(B), 5(C), and 5(D) are diagrams for illustrating a falling response index of the air-fuel ratio sensor detected by a catalyst-upstream air-fuel-ratio falling-response-index detector and a catalyst-downstream air-fuel-ratio falling-response-index detector used in the apparatus for diagnosing the exhaust gas purifying device according to the embodiment of the present invention.
Figure 6:
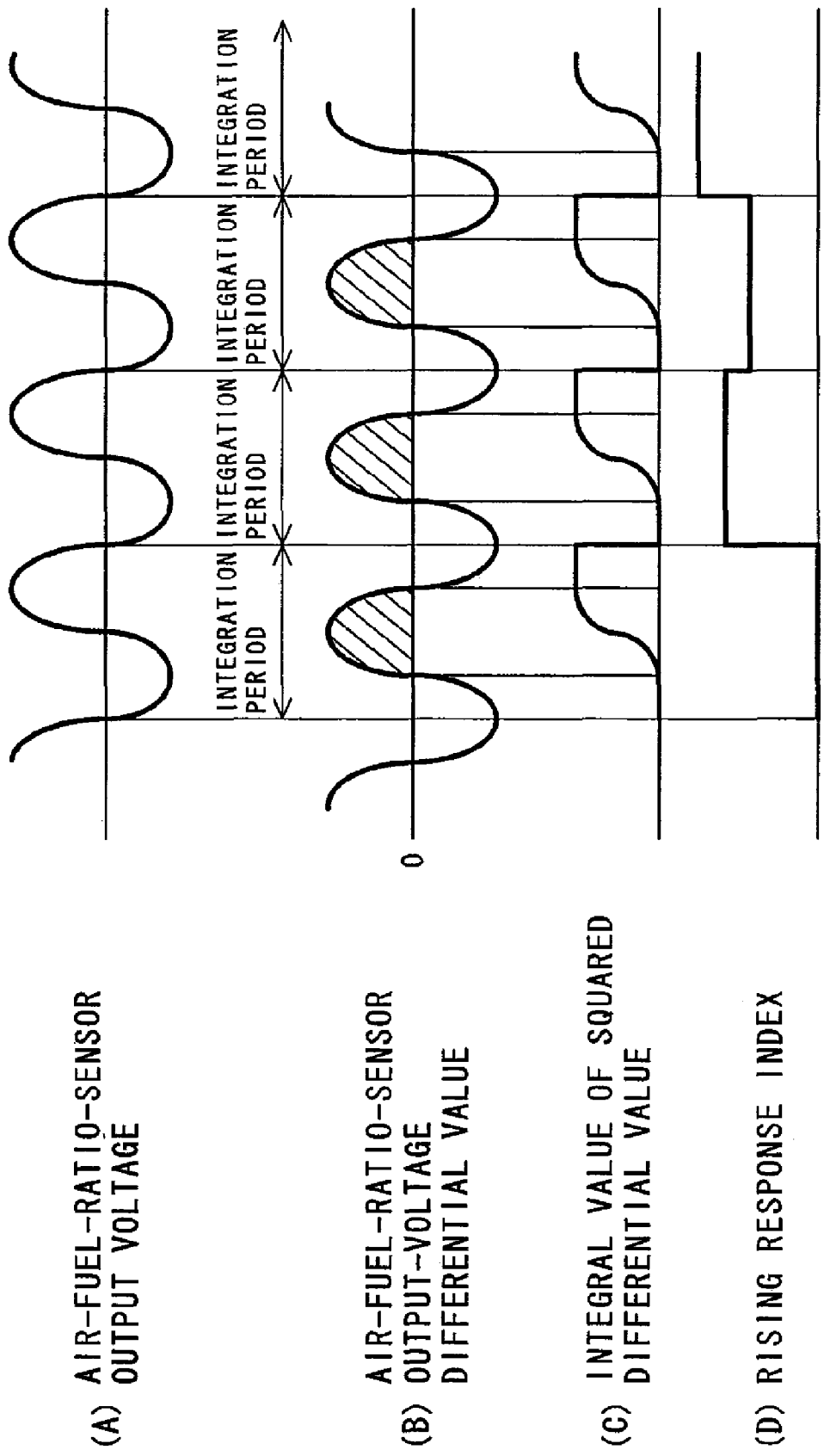
FIGS. 6(A), 6(B), 6(C), and 6(D) are diagrams for illustrating a rising response index of the air-fuel ratio sensor detected by a catalyst-upstream air-fuel-ratio rising-response-index detector and a catalyst-downstream air-fuel-ratio rising-response-index detector used in the apparatus for diagnosing the exhaust gas purifying device according to the embodiment of the present invention.

FIG. 2 is a block diagram showing the configuration of the apparatus for diagnosing the exhaust gas purifying device according to the embodiment of the present invention.

The apparatus for diagnosing the exhaust gas purifying device according to the embodiment of the present invention is provided inside the internal combustion engine control unit 207 shown in FIG. 1. The block diagram of the apparatus for diagnosing the exhaust gas purifying device according to the embodiment of the present invention is as shown in FIG. 2.

A catalyst-upstream air-fuel-ratio detector 101 detects the air-fuel ratio upstream of the catalyst, and a catalyst-downstream air-fuel-ratio detector 102 detects the air-fuel ratio downstream of the catalyst. If a catalyst diagnosis permission section 103 judges catalyst diagnosis to be possible, a catalyst deterioration level detector 104 detects the deterioration level of the catalyst. To detect the deterioration level of the catalyst, the catalyst deterioration level detector 104 uses, as a catalyst deterioration index, a ratio between a cross-correlation function and an auto-correlation function calculated from the air-fuel ratios detected upstream and downstream of the catalyst. Other possible indices include a period ratio of air-fuel ratio fluctuations, a ratio of the numbers of the air-fuel ratio fluctuations, and the like.

A catalyst-upstream air-fuel-ratio falling-response-index detector 105 detects the falling response index of the air-fuel ratio detected upstream of the catalyst. A catalyst-downstream air-fuel-ratio falling-response-index detector 106 detects the falling response index of the air-fuel ratio detected downstream of the catalyst. An air-fuel-ratio falling-response-ratio detector 107 calculates a falling response ratio. A catalyst-upstream air-fuel-ratio rising-response-index detector 108 detects the rising response index of the air-fuel ratio detected upstream of the catalyst. A catalyst-downstream air-fuel-ratio rising-response-index detector 109 detects the rising response index of the air-fuel ratio detected downstream of the catalyst. An air-fuel-ratio rising-response-ratio detector 110 calculates a rising response ratio. A catalyst-deterioration-level correction section 111 calculates a correction value from the falling response ratio and the rising response ratio using a describing function. The correction value is then multiplied by a catalyst deterioration index to find a final catalyst deterioration index. A catalyst deterioration judgment section 112 compares the final catalyst deterioration index with a predetermined value to determine whether the catalyst is deteriorated.

The judgments involved in the above catalyst deterioration diagnosis will be specifically described with reference to FIGS. 3(A) and 3(B) and the subsequent figures.

The operation of the apparatus for diagnosing the exhaust gas purifying device according to the embodiment of the present invention will be described with reference to FIGS. 3 through 16.

Described first with reference to FIGS. 3(A) and 3(B), and 4(A), 4(B), and 4(C) are the output voltage of the catalyst-upstream air-fuel-ratio sensor and that of the catalyst-downstream air-fuel-ratio sensor when the catalyst is deteriorated, as detected by the catalyst-upstream air-fuel-ratio detector 101 and the catalyst-downstream air-fuel-ratio detector 102, respectively, used in the apparatus for diagnosing the exhaust gas purifying device according to the embodiment of the present invention.

FIGS. 3(A) and 3(B) are diagrams for illustrating the output voltage of the catalyst-upstream air-fuel-ratio sensor and that of the catalyst-downstream air-fuel-ratio sensor when the catalyst is deteriorated with the response of the catalyst-downstream air-fuel-ratio sensor being normal. FIGS. 4(A), 4(B), and 4(C) are diagrams for illustrating the output voltage of the catalyst-upstream air-fuel-ratio sensor and that of the catalyst-downstream air-fuel-ratio sensor when the catalyst is deteriorated with the response of the catalyst-downstream air-fuel-ratio sensor being degraded.

It is assumed that, in FIGS. 3(A) and 3(B), the response of the catalyst-downstream air-fuel-ratio sensor (215 of FIG. 1) is normal. If the catalyst is deteriorated, the output voltage (FIG. 3(B)) of the catalyst-downstream air-fuel-ratio sensor detected by the catalyst-downstream air-fuel-ratio detector 102 of FIG. 2 is similar to that (FIG. 3(A)) of the catalyst-upstream air-fuel-ratio sensor detected by the catalyst-upstream air-fuel-ratio detector 101 of FIG. 2. At this time, the catalyst deterioration index (the ratio between the cross-correlation function and the auto-correlation function, the period ratio of the air-fuel ratio fluctuations, the ratio of the numbers of the air-fuel ratio fluctuations, and the like) exhibits a value indicating the deteriorated condition, allowing the apparatus to determine that the catalyst is deteriorated.

In FIGS. 4(A), 4(B), and 4(C), it is instead assumed that the response of the catalyst-downstream air-fuel-ratio sensor (215 of FIG. 1) is degraded. The output voltage of the catalyst-downstream air-fuel-ratio sensor detected by the catalyst-downstream air-fuel-ratio detector 102 of FIG. 2 is not similar to that (FIG. 4(A)) of the catalyst-upstream air-fuel-ratio sensor detected by the catalyst-upstream air-fuel-ratio detector 101 of FIG. 2 despite the deteriorated condition of the catalyst due to a falling response delay (FIG. 4(B)) or a rising response delay (FIG. 4(C)). Accordingly, the catalyst deterioration index fails to provide a value suggesting the deteriorated condition, and the apparatus becomes unable to determine that the catalyst is deteriorated. The embodiment of the present invention aims to solve this problem.

The falling response index of the air-fuel ratio sensor detected by the catalyst-upstream air-fuel-ratio falling-response-index detector 105 and the catalyst-downstream air-fuel-ratio falling-response-index detector 106 used in the apparatus for diagnosing the exhaust gas purifying device according to the embodiment of the present invention will be described with reference to FIGS. 5(A) to 5(D).

FIGS. 5(A), 5(B), 5(C), and 5(D) are diagrams for illustrating the falling response index of the air-fuel ratio sensor detected by the catalyst-upstream air-fuel-ratio falling-response-index detector 105 and the catalyst-downstream air-fuel-ratio falling-response-index detector 106 used in the apparatus for diagnosing the exhaust gas purifying device according to the embodiment of the present invention.

The catalyst-upstream air-fuel-ratio falling-response-index detector 105 and the catalyst-downstream air-fuel-ratio falling-response-index detector 106 shown in FIG. 2 differentiate the output voltage of the air-fuel ratio sensor (FIG. 5(A)) to obtain an air-fuel ratio sensor output voltage differential value shown in FIG. 5(B). If the differential value is negative, the square of the differential value is integrated, with one period of the air-fuel ratio sensor output voltage as an integration period, to thereby obtain the differential-value-squared integral value of the air-fuel ratio sensor output voltage differential value shown in FIG. 5(C). One integration period is such that, assuming, for example, that the output voltage of the air-fuel ratio sensor averages 0.5 V, the integration starts at a point in time when the air-fuel ratio sensor output voltage reaches 0.5 V with gradual increments from a value smaller than 0.5 V. Further, the differential-value-squared integral value shown in FIG. 5(C) corresponds to the area of negative differential values in FIG. 5(B) (specifically, the cross-hatched area). The final value of the differential-value-squared integral value shown in FIG. 5(C) is the falling response index shown in FIG. 5(D).

The rising response index of the air-fuel ratio sensor detected by the catalyst-upstream air-fuel-ratio rising-response-index detector 108 and the catalyst-downstream air-fuel-ratio rising-response-index detector 109 used in the apparatus for diagnosing the exhaust gas purifying device according to the embodiment of the present invention will be described with reference to FIGS. 6(A) to 6(D).

FIGS. 6(A), 6(B), 6(C), and 6(D) are diagrams for illustrating the rising response index of the air-fuel ratio sensor detected by the catalyst-upstream air-fuel-ratio rising-response-index detector 108 and the catalyst-downstream air-fuel-ratio rising-response-index detector 109 used in the apparatus for diagnosing the exhaust gas purifying device according to the embodiment of the present invention.

The catalyst-upstream air-fuel-ratio rising-response-index detector 108 and the catalyst-downstream air-fuel-ratio rising-response-index detector 109 shown in FIG. 2 differentiate the output voltage of the air-fuel ratio sensor (FIG. 6(A)) to obtain an air-fuel ratio sensor output voltage differential value shown in FIG. 6(B). If the differential value is positive, the square of the differential value is integrated, with one period of the air-fuel ratio sensor output voltage as an integration period, to thereby obtain the differential-value-squared integral value of the air-fuel ratio sensor output voltage differential value shown in FIG. 6(C). One integration period is such that, assuming, for example, that the output voltage of the air-fuel ratio sensor averages 0.5 V, the integration starts at a point in time when the air-fuel ratio sensor output voltage reaches 0.5 V with gradual decrements from a value greater than 0.5 V. Further, the differential-value-squared integral value shown in FIG. 6(C) corresponds to the area of positive differential values in FIG. 6(B) (specifically, the cross-hatched area). The final value of the differential-value-squared integral value shown in FIG. 6(C) is the rising response index shown in FIG. 6(D).

The relationship between the air-fuel ratio falling response index and the falling response time constant used in the apparatus for diagnosing the exhaust gas purifying device according to the embodiment of the present invention will be described with reference to FIG. 7.

Figure 7:
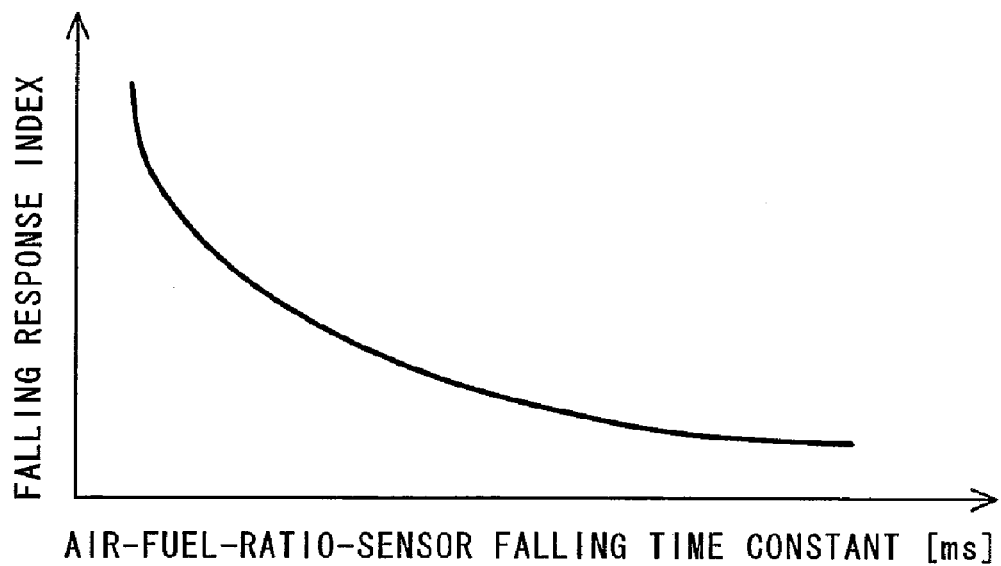
FIG. 7 is a diagram for illustrating the relationship between the air-fuel-ratio falling response index and a falling response time constant used in the apparatus for diagnosing the exhaust gas purifying device according to the embodiment of the present invention.

FIG. 7 is a diagram for illustrating the relationship between the air-fuel ratio falling response index and the falling response time constant used in the apparatus for diagnosing the exhaust gas purifying device according to the embodiment of the present invention.

As shown in FIG. 7, the falling response index is inversely proportional to the falling response time constant, and the falling response time constant can be detected from the falling response index.

The relationship between the air-fuel ratio rising response index and the rising response time constant used in the apparatus for diagnosing the exhaust gas purifying device according to the embodiment of the present invention will be described with reference to FIG. 8.

Figure 8:
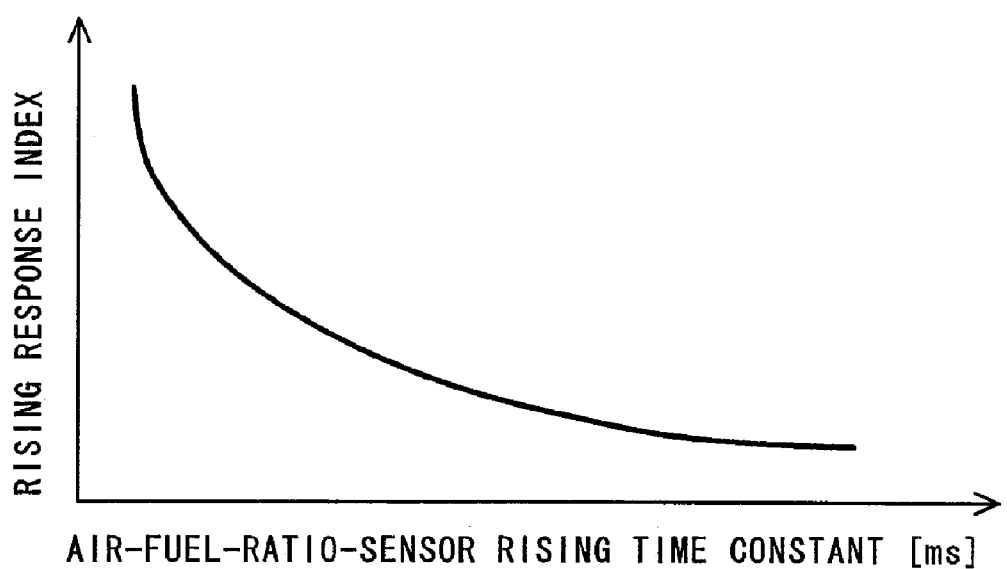
FIG. 8 is a diagram for illustrating the relationship between the air-fuel-ratio rising response index and a rising response time constant used in the apparatus for diagnosing the exhaust gas purifying device according to the embodiment of the present invention.
Figure 9:
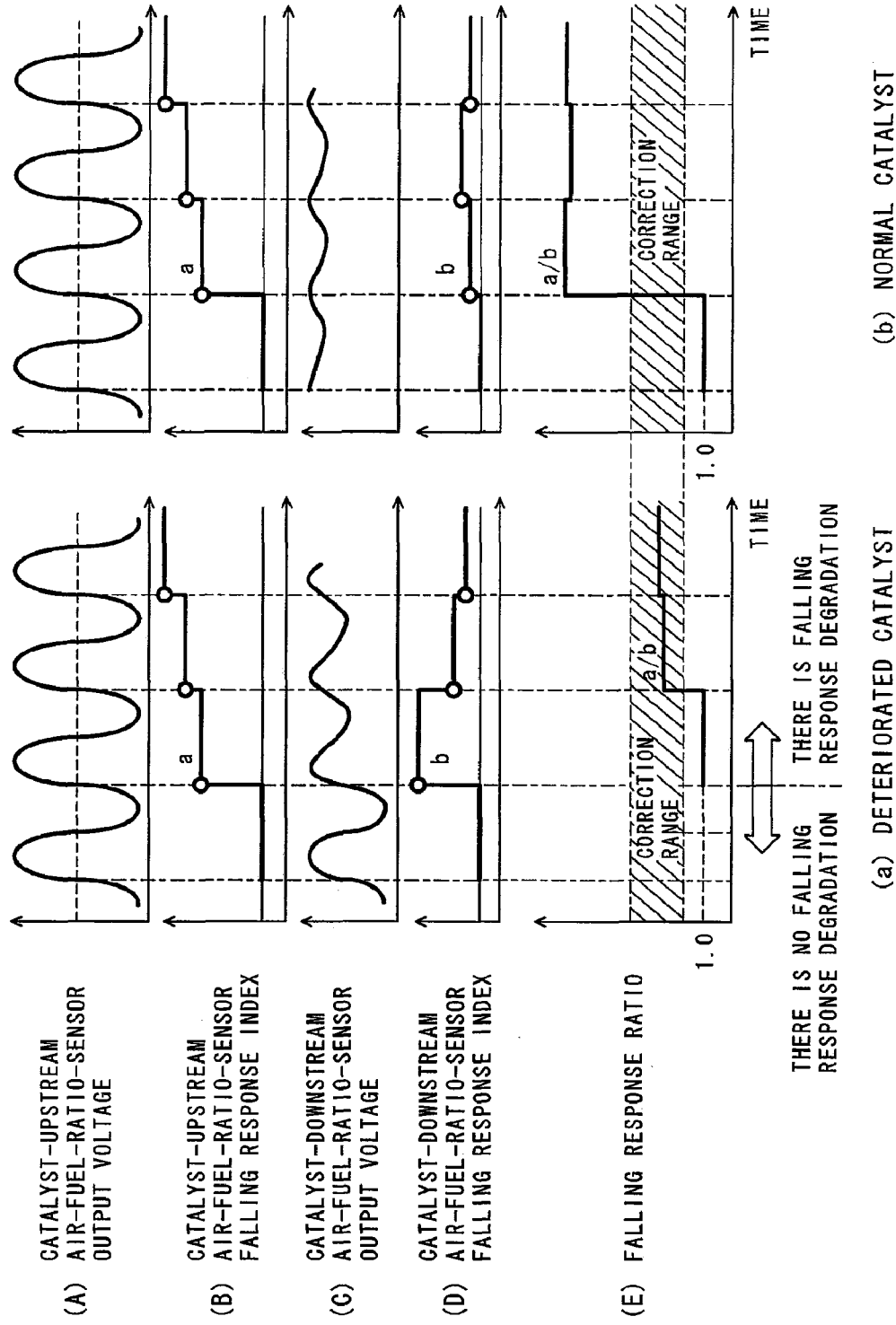
FIGS. 9(A), 9(B), 9(C), 9(D), and 9(E) are diagrams for illustrating a falling response ratio detected by the air-fuel-ratio falling-response-ratio detector of the apparatus for diagnosing the exhaust gas purifying device according to the embodiment of the present invention.

FIG. 8 is a diagram for illustrating the relationship between the air-fuel ratio rising response index and the rising response time constant used in the apparatus for diagnosing the exhaust gas purifying device according to the embodiment of the present invention.

As shown in FIG. 8, the rising response index is inversely proportional to the rising response time constant, and the rising response time constant can be detected from the rising response index.

In the arithmetic operation for the catalyst-upstream air-fuel-ratio sensor response index performed by the catalyst-upstream air-fuel-ratio falling-response-index detector 105 or the catalyst-upstream air-fuel-ratio rising-response-index detector 108 shown in FIG. 2, the fuel injection control executes feedback control by referring to the output voltage of the air-fuel ratio sensor upstream of the catalyst. Because the output voltage of the air-fuel ratio sensor upstream of the catalyst fluctuates cyclically, the integration period can be reliably determined.

In the arithmetic operation for the catalyst-downstream air-fuel-ratio sensor response index performed by the catalyst-downstream air-fuel-ratio falling-response-index detector 106 or the catalyst-downstream air-fuel-ratio rising-response-index detector 109, in contrast, there are no cyclic fluctuations of the output voltage of the air-fuel ratio sensor downstream of the catalyst, as with the output voltage of the air-fuel ratio sensor upstream of the catalyst, even in the fuel injection control executing the feedback control by referring to the output voltage of the air-fuel ratio sensor downstream of the catalyst. Accordingly, for the arithmetic operation for the catalyst-downstream air-fuel-ratio-sensor response index, the same integration period as that for the arithmetic operation for the catalyst-upstream air-fuel-ratio-sensor response index is set. The falling response ratio and the rising response ratio are thereby calculated at the end of each integration period.

Arithmetic expressions for the falling response ratio and the rising response ratio are shown below as equations (1) and (2).

Falling response ratio=catalyst-upstream air-fuel-ratio-sensor falling response index/catalyst-downstream air-fuel-ratio-sensor falling response index (1)

Rising response ratio=catalyst-upstream air-fuel-ratio-sensor rising response index/catalyst-downstream air-fuel-ratio-sensor rising response index (2)

The falling and rising response indices of the catalyst-downstream air-fuel-ratio sensor are not affected by the catalyst if the catalyst is deteriorated. Accordingly, accurate values can be detected for the falling response ratio and the rising response ratio to be calculated. If the catalyst is not deteriorated (a normal catalyst), on the other hand, because of an effect from the action of the catalyst, the change in the air-fuel ratio after the catalyst becomes moderate; the falling and rising response indices of the catalyst-downstream air-fuel-ratio sensor do not truly represent the response time constant of the catalyst-downstream air-fuel-ratio sensor. In this case, the response indices of the catalyst-downstream air-fuel-ratio sensor are calculated to be apparently very small values. The response ratios, as a result, become substantially larger as compared with those for a deteriorated catalyst.

To state it another way, an inordinately large response ratio indicates that the catalyst is normal, and not deteriorated. In such a case, there is no need to correct the catalyst deterioration indices, and no correction is thus made.

The response ratio becomes inordinately large also if the air-fuel ratio sensor downstream of the catalyst is degraded in terms of response. Such a degraded sensor can, however, be diagnosed by a response performance diagnosis available from the sensor itself. In this case, the catalyst diagnosis cannot be executed properly. Therefore, if the sensor is judged to be degraded in terms of response, the catalyst diagnosis permission section 103 prohibits the catalysis diagnosis. The air-fuel ratio sensor downstream of the catalyst may be diagnosed for the response performance by a conventional practice of using the response time during a fuel cut or an increase in the amount of fuel.

The falling response ratio detected by the air-fuel-ratio falling-response-ratio detector 107 of the apparatus for diagnosing the exhaust gas purifying device according to the embodiment of the present invention will be described below with reference to FIGS. 9(A), 9(B), 9(C), 9(D), and 9(E).

FIGS. 9(A), 9(B), 9(C), 9(D), and 9(E) are diagrams for illustrating the falling response ratio detected by the air-fuel-ratio falling-response-ratio detector 107 of the apparatus for diagnosing the exhaust gas purifying device according to the embodiment of the present invention.

In FIGS. 9(A), 9(B), 9(C), 9(D), and 9(E), the abscissa represents time. The ordinate of FIG. 9(A) represents the catalyst-upstream air-fuel-ratio-sensor output voltage, and that of FIG. 9(B) represents the falling response index of the catalyst-upstream air-fuel-ratio sensor. The ordinate of FIG. 9(C) represents the catalyst-downstream air-fuel-ratio-sensor output voltage, and that of FIG. 9(D) represents the falling response index of the catalyst-downstream air-fuel-ratio sensor. The ordinate of FIG. 9(E) represents the falling response ratio. The abscissae and ordinates of FIGS. 10(A) to 10(E) represent the same as those of FIGS. 9(A) to 9(E).

FIG. 9(A) shows the catalyst-upstream air-fuel-ratio-sensor output voltage (FIG. 9(A)), the catalyst-upstream air-fuel-ratio-sensor falling response index (FIG. 9(B)), the catalyst-downstream air-fuel-ratio-sensor output voltage (FIG. 9(C)), the catalyst-downstream air-fuel-ratio-sensor falling response index (FIG. 9(D)), and the falling response ratio (FIG. 9(E)) for a deteriorated catalyst.

In FIGS. 9(A), 9(B), 9(C), 9(D), and 9(E), there is no falling response degradation of the catalyst-downstream air-fuel-ratio sensor before a time t1, and there is falling response degradation of the catalyst-downstream air-fuel-ratio sensor after the time t1.

For the deteriorated catalyst, the falling response ratio reads substantially a value of 1.0 when without falling response degradation. When the falling response degradation occurs, however, the falling response ratio becomes 1.0 or more.

FIG. 9(B) shows the catalyst-upstream air-fuel-ratio-sensor output voltage, the catalyst-upstream air-fuel-ratio-sensor falling response index, the catalyst-downstream air-fuel-ratio-sensor output voltage, the catalyst-downstream air-fuel-ratio-sensor falling response index, and the falling response ratio for a normal catalyst with no deterioration.

FIG. 9(B) shows a case in which there is no degradation of falling response of the catalyst-downstream air-fuel-ratio sensor.

With a normal, not deteriorated catalyst, the falling response ratio becomes an inordinately large value. For the reason stated earlier, no correction of the falling response ratio is made if the falling response ratio is equal to or more than a predetermined value. If the falling response ratio is close to 1.0, the catalyst-upstream air-fuel-ratio-sensor falling response index is equal to the catalyst-downstream air-fuel-ratio-sensor falling response index, which means that the catalyst is deteriorated. In such cases, too, there is no need to make a correction of the falling response ratio. Correction of the falling response ratio made by the catalyst-deterioration-level correction section 111 shown in FIG. 2 is therefore executed only if the falling response ratio falls within a predetermined range.

The rising response ratio detected by the air-fuel-ratio rising-response-ratio detector 110 of the apparatus for diagnosing the exhaust gas purifying device according to the embodiment of the present invention will be described below with reference to FIGS. 10(A), 10(B), 10(C), 10(D), and 10(E).

FIGS. 10(A), 10(B), 10(C), 10(D), and 10(E) are diagrams for illustrating the rising response ratio detected by the air-fuel-ratio rising-response-ratio detector 110 of the apparatus for diagnosing the exhaust gas purifying device according to the embodiment of the present invention.

In FIGS. 10(A), 10(B), 10(C), 10(D), and 10(E), the abscissa represents time. The ordinate of FIG. 10(A) represents the catalyst-upstream air-fuel-ratio-sensor output voltage, and that of FIG. 10(B) represents the rising response index of the catalyst-upstream air-fuel-ratio sensor. The ordinate of FIG. 10(C) represents the catalyst-downstream air-fuel-ratio-sensor output voltage, and that of FIG. 10(D) represents the rising response index of the catalyst-downstream air-fuel-ratio sensor. The ordinate of FIG. 10(E) represents the falling response ratio.

FIG. 10(A) shows the catalyst-upstream air-fuel-ratio-sensor output voltage, the catalyst-upstream air-fuel-ratio-sensor rising response index, the catalyst-downstream air-fuel-ratio-sensor output voltage, the catalyst-downstream air-fuel-ratio-sensor rising response index, and the rising response ratio for a deteriorated catalyst.

In FIG. 10(A), there is no rising response degradation of the catalyst-downstream air-fuel-ratio sensor before a time t1, and there is rising response degradation of the catalyst-downstream air-fuel-ratio sensor after the time t1.

For the deteriorated catalyst, the rising response ratio reads substantially a value of 1.0 when without rising response degradation. When the rising response degradation occurs, however, the rising response ratio becomes 1.0 or more.

FIG. 10(B) shows the catalyst-upstream air-fuel-ratio-sensor output voltage, the catalyst-upstream air-fuel-ratio-sensor rising response index, the catalyst-downstream air-fuel-ratio-sensor output voltage, the catalyst-downstream air-fuel-ratio-sensor rising response index, and the rising response ratio for a normal catalyst with no deterioration.

FIG. 10(B) shows a case in which there is no degradation of rising response of the catalyst-downstream air-fuel-ratio sensor.

With a normal, not deteriorated catalyst, the rising response ratio becomes an inordinately large value. For the reason stated earlier, no correction of the rising response ratio is made if the rising response ratio is equal to or more than a predetermined value. If the rising response ratio is close to 1.0, the catalyst-upstream air-fuel-ratio-sensor rising response index is equal to the catalyst-downstream air-fuel-ratio-sensor rising response index, which means that the catalyst is deteriorated. In such cases, too, there is no need to make a correction of the rising response ratio. Correction of the rising response ratio made by the catalyst-deterioration-level correction section 111 shown in FIG. 2 is therefore executed only if the rising response ratio falls within a predetermined range.

The relationship between the falling response index and the catalyst deterioration index in the apparatus for diagnosing the exhaust gas purifying device according to the embodiment of the present invention will be next described with reference to FIGS. 11A and 11B.

Figures 11A, 11B:
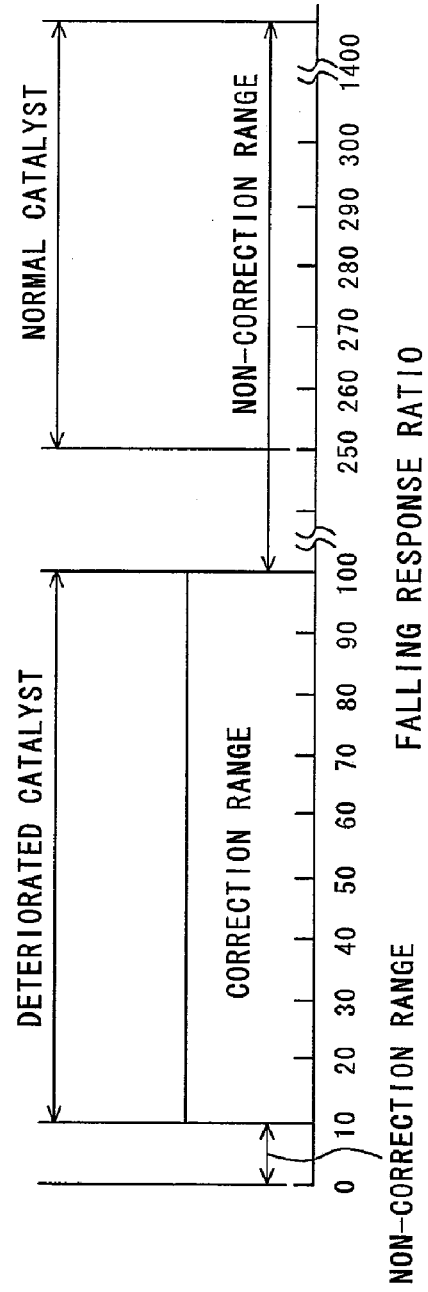
FIGS. 11(A) and 11(B) are diagrams for illustrating the relationship between the falling response index and a catalyst deterioration index in the apparatus for diagnosing the exhaust gas purifying device according to the embodiment of the present invention.

FIGS. 11A and 11B are diagrams for illustrating the relationship between the falling response index and the catalyst deterioration index in the apparatus for diagnosing the exhaust gas purifying device according to the embodiment of the present invention.

FIGS. 11A and 11B show actually measured experimental data. The experiment is concerned with the falling response correction, using a brand-new catalyst and a deteriorated one. When the falling time constant of the air-fuel ratio sensor downstream of the catalyst is varied in the range between 0 ms and 2000 ms, the falling response ratio fluctuates between 250 and 1400 for the new catalyst, resulting in a catalyst deterioration index (cross-correlation function/auto-correlation function) fluctuating between 0.0039 and 0.0234.

For the deteriorated catalyst, the falling response ratio fluctuates between 9 and 100, resulting in a catalyst deterioration index (cross-correlation function/auto-correlation function) fluctuating between 0.20 and 0.70.

Any deteriorated catalyst must be judged to be deteriorated; in accordance with the embodiment of the present invention, a catalyst is judged to be deteriorated if the catalyst deterioration index is 0.5 or more. When the falling time constant of the air-fuel ratio sensor downstream of the catalyst becomes 500 ms or more, the catalyst deterioration index becomes 0.5 or less, and the catalyst cannot be judged to be deteriorated as described in the summary of the invention.

When the falling response ratio ranges between 10 and 100, therefore, the catalyst deterioration index is corrected using the catalyst-deterioration-level correction section 111. For the reason mentioned earlier, the catalyst deterioration index is corrected when the falling response ratio falls within a predetermined range.

The falling response correction value used by the catalyst-deterioration-level correction section 111 of the apparatus for diagnosing the exhaust gas purifying device according to the embodiment of the present invention will be described below with reference to FIG. 12(A) and FIG. 12(B).

Figures 12A, 12B:
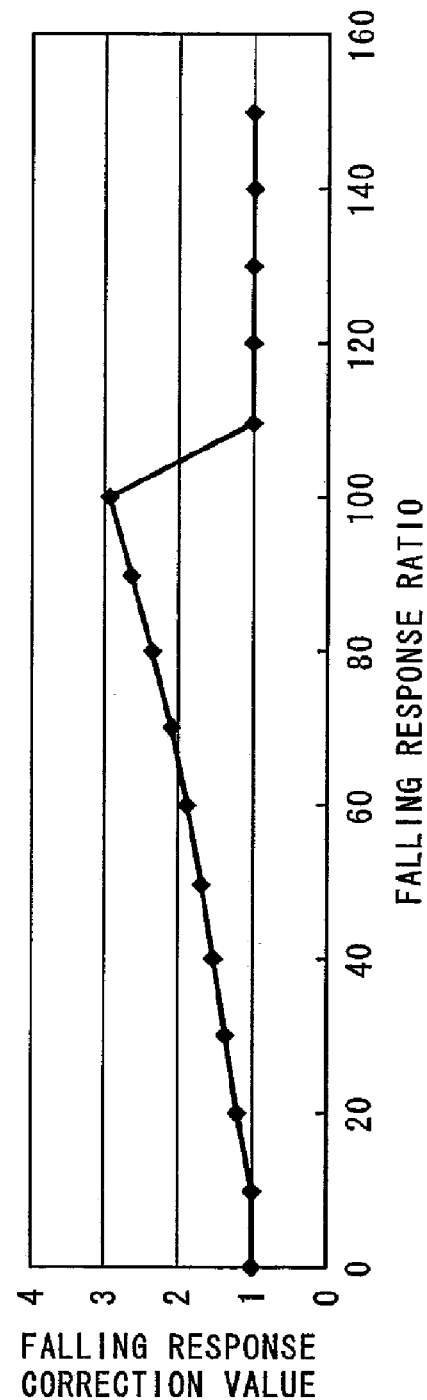
FIGS. 12(A) and 12(B) are diagrams for illustrating a falling response correction value used in a catalyst-deterioration-level correction section of the apparatus for diagnosing the exhaust gas purifying device according to the embodiment of the present invention.

FIGS. 12(A) and 12(B) are diagrams for illustrating the falling response correction value used in the catalyst-deterioration-level correction section 111 of the apparatus for diagnosing the exhaust gas purifying device according to the embodiment of the present invention.

The catalyst-deterioration-level correction section 111 stores in advance the falling response correction values shown in FIGS. 12(A) and 12(B) as a describing function using a map or table. The catalyst-deterioration-level correction section 111 calculates the falling response correction value by performing supplementary calculations of the above-referenced describing function using the air-fuel-ratio falling response ratio detected by the air-fuel-ratio falling-response-ratio detector 107. Further, the catalyst-deterioration-level correction section 111 multiplies the catalyst deterioration index detected by the catalyst deterioration level detector 104 by the falling response correction value for making a correction. According to the embodiment of the present invention, the correction is such that the catalyst deterioration index is multiplied by approximately 3 when the falling response ratio is 100.

The result of the correction made by the catalyst-deterioration-level correction section 111 of the apparatus for diagnosing the exhaust gas purifying device according to the embodiment of the present invention will be described below with reference to FIG. 13.

FIG. 13 is a diagram for illustrating the result of correction made by the catalyst-deterioration-level correction section 111 of the apparatus for diagnosing the exhaust gas purifying device according to the embodiment of the present invention.

In FIG. 13, the abscissa represents the catalyst-downstream air-fuel-ratio-sensor falling time constant (ms), and the ordinate represents the final catalyst deterioration index corrected by the catalyst-deterioration-level correction section 111.

Comparing the data before and after the execution of the falling response ratio correction, it can be understood that, before the correction, a deteriorated catalyst cannot be judged to be deteriorated when the falling time constant of the air-fuel ratio sensor downstream of the catalyst is 500 ms or more. Through the correction by the catalyst-deterioration-level correction section 111, in contrast, the catalyst deterioration index reads values of 0.5 or more regardless of the falling time constant of the air-fuel ratio sensor downstream of the catalyst. This allows a deteriorated catalyst to be judged as such.

Similar results are yielded for the rising response ratio correction.

Operations performed by the catalyst diagnosis permission section 103 of the apparatus for diagnosing the exhaust gas purifying device according to the embodiment of the present invention will be described below with reference to FIG. 14.

FIG. 14 is a flowchart showing the details of the operations performed by the catalyst diagnosis permission section 103 of the apparatus for diagnosing the exhaust gas purifying device according to the embodiment of the present invention.

In step 1401, the catalyst diagnosis permission section 103 determines if the speed of the internal combustion engine falls within a predetermined range.

In step 1402, the catalyst diagnosis permission section 103 determines if the load of the internal combustion engine falls within a predetermined range. In step 1403, the catalyst diagnosis permission section 103 determines if the vehicle speed is a predetermined value or more. In step 1404, the catalyst diagnosis permission section 103 determines if the coolant temperature is a predetermined value or more.

In step 1405, the catalyst diagnosis permission section 103 checks to see if the internal combustion engine is in a process of the air-fuel-ratio feedback control. In step 1406, the catalyst diagnosis permission section 103 determines if the catalyst is activated. In step 1407, the catalyst diagnosis permission section 103 determines if all sensors used are normal.

In step 1408, if all conditions from steps 1401 through 1407 are met, the catalyst diagnosis permission section 103 determines that a diagnosis can be performed.

If any of the conditions from steps 1401 through 1407 is not met, the catalyst diagnosis permission section 103 determines in step 1409 that the diagnosis cannot be performed.

Operations performed by the catalyst-upstream air-fuel-ratio detector 101 and the catalyst-downstream air-fuel-ratio detector 102 of the apparatus for diagnosing the exhaust gas purifying device according to the embodiment of the present invention will be described below with reference to FIG. 15.

Figure 15:
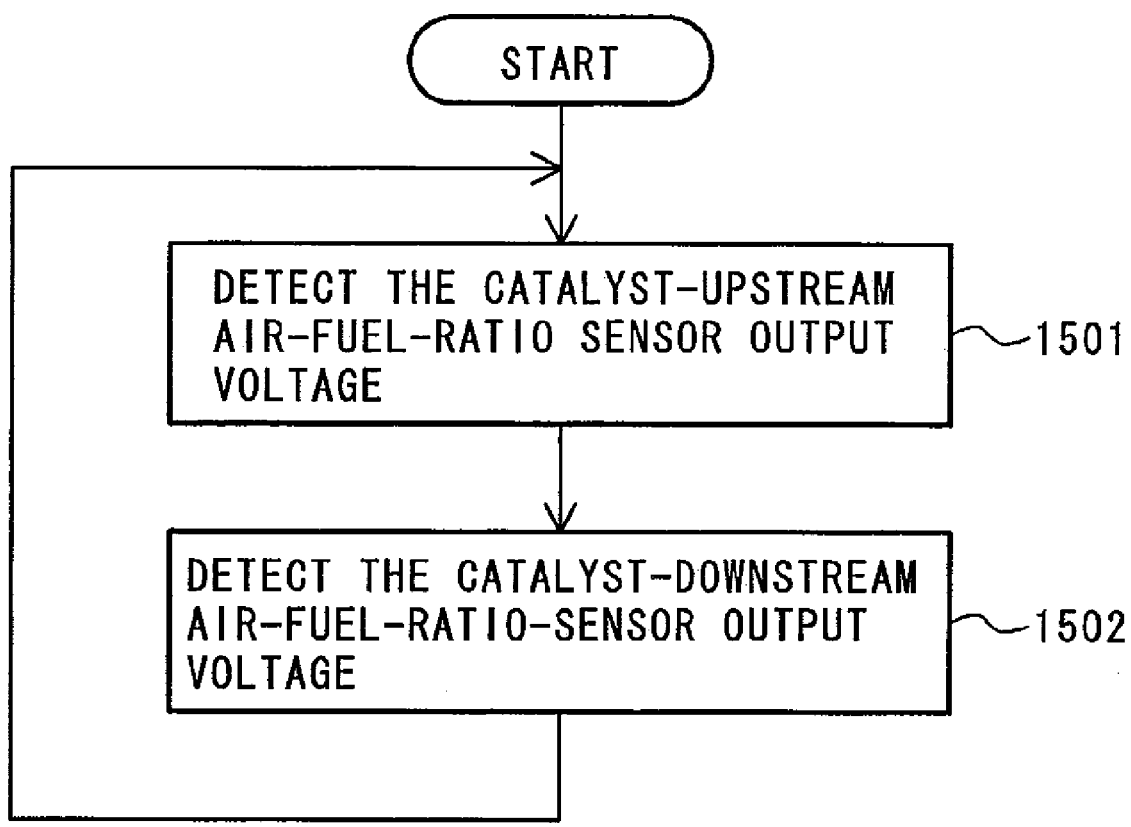
FIG. 15 is a flowchart showing the details of the operations performed by an air-fuel ratio detector upstream of the catalyst and an air-fuel ratio detector downstream of the catalyst of the apparatus for diagnosing the exhaust gas purifying device according to the embodiment of the present invention.

FIG. 15 is a flowchart showing the details of the operations performed by the catalyst-upstream air-fuel-ratio detector 101 and the catalyst-downstream air-fuel-ratio detector 102 of the apparatus for diagnosing the exhaust gas purifying device according to the embodiment of the present invention.

The flowchart of FIG. 15 represents the reading operations of air-fuel-ratio-sensor output voltages. In step 1501, the catalyst-upstream air-fuel-ratio detector 101 detects the output voltage of the air-fuel ratio sensor upstream of the catalyst.

In step 1502 that follows, the catalyst-downstream air-fuel-ratio detector 102 detects the output voltage of the air-fuel ratio sensor downstream of the catalyst.

The details of operations performed by the apparatus for diagnosing the exhaust gas purifying device according to the embodiment of the present invention will be described below with reference to FIG. 16.

Figure 16:
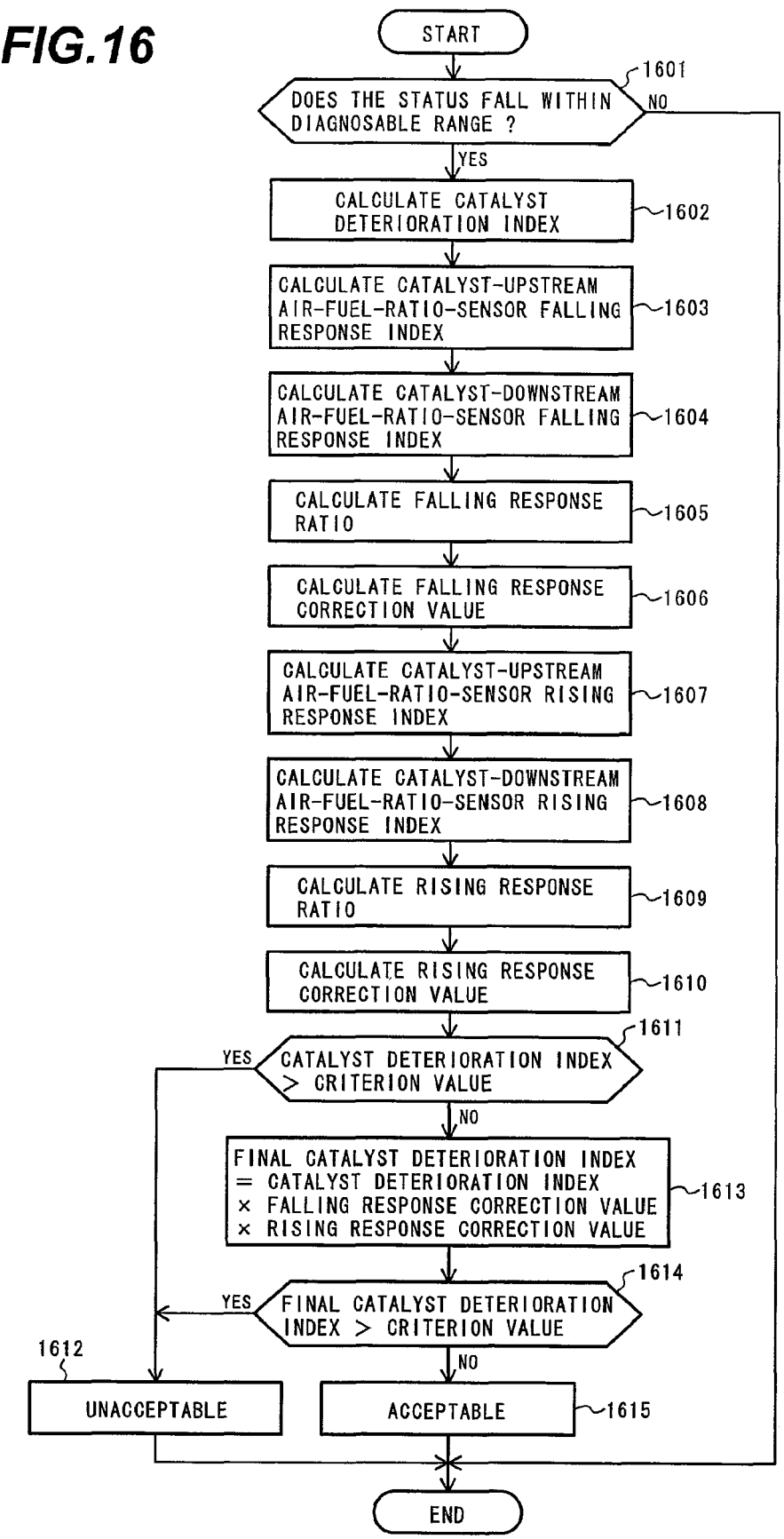
FIG. 16 is a flowchart showing the details of the operations performed by the apparatus for diagnosing the exhaust gas purifying device according to the embodiment of the present invention.

FIG. 16 is a flowchart showing the details of the operations performed by the apparatus for diagnosing the exhaust gas purifying device according to the embodiment of the present invention.

In step 1601, the catalyst diagnosis permission section 103 determines if the condition falls within the diagnosable range. If the condition falls within the diagnosable range, the operations of step 1602 and onward are executed. If it is determined in step 1601 that the condition falls outside the diagnosable range, then no operation will be performed. The operations to be performed when the condition falls within the diagnosable range are described next.

In step 1602, the catalyst deterioration level detector 104 calculates the catalyst deterioration index. The catalyst deterioration index is calculated from the ratio between the cross-correlation function and auto-correlation function of the catalyst-upstream air-fuel-ratio-sensor output voltage and the catalyst-downstream air-fuel-ratio-sensor output voltage. The catalyst deterioration index may also be calculated from the period ratio between the catalyst-upstream air-fuel-ratio-sensor output voltage and the catalyst-downstream air-fuel-ratio-sensor output voltage or the ratio of the numbers of fluctuations occurring during a predetermined period of time.

In step 1603, the catalyst-upstream air-fuel-ratio falling-response-index detector 105 calculates the falling response index of the catalyst-upstream air-fuel-ratio-sensor output voltage. In step 1604, the catalyst-downstream air-fuel-ratio falling-response-index detector 106 calculates the falling response index of the catalyst-downstream air-fuel-ratio-sensor output voltage. The falling response index is calculated using the method described with reference to FIGS. 5(A) to 5(D).

In step 1605, the air-fuel-ratio falling-response-ratio detector 105 calculates the falling response ratio using the equation (1) mentioned earlier. In step 1606, the catalyst-deterioration-level correction section 111 calculates the falling response correction value from the falling response ratio using the describing function or the like. The above-referenced steps 1603 through 1606 constitute a group of steps for calculating the falling response correction value.

Similarly, the following steps 1607 through 1610 constitute a group of steps for calculating a rising response correction value.

In step 1607, the catalyst-upstream air-fuel-ratio rising-response-index detector 108 calculates the rising response index of the catalyst-upstream air-fuel-ratio-sensor output voltage. In step 1608, the catalyst-downstream air-fuel-ratio rising-response-index detector 109 calculates the rising response index of the catalyst-downstream air-fuel-ratio-sensor output voltage. The rising response index is calculated using the method described with reference to FIGS. 6(A) to 6(D).

In step 1609, the air-fuel-ratio rising-response-ratio detector 110 calculates the rising response ratio using the equation (2) mentioned earlier. In step 1610, the catalyst-deterioration-level correction section 111 calculates the rising response correction value from the rising response ratio using the describing function or the like.

The falling response indices of the output voltages of the air-fuel ratio sensors upstream and downstream of the catalyst, the rising response indices of the output voltages of the air-fuel ratio sensors upstream and downstream of the catalyst, the falling response ratio, the rising response ratio, the falling response correction value, and the rising response correction value, all obtained through the above-referenced calculations, may be stored in nonvolatile memory or battery backed-up memory.

The falling response indices of the output voltages of the air-fuel ratio sensors upstream and downstream of the catalyst, the rising response indices of the output voltages of the air-fuel ratio sensors upstream and downstream of the catalyst, the falling response ratio, the rising response ratio, the falling response correction value, and the rising response correction value, all stored in memory, may be learned through the following procedure. Specifically, each of the falling response indices of the output voltages of the air-fuel ratio sensors upstream and downstream of the catalyst, the rising response indices of the output voltages of the air-fuel ratio sensors upstream and downstream of the catalyst, the falling response ratio, the rising response ratio, the falling response correction value, and the rising response correction value, all stored in memory, is compared with a newly detected value: if there is a small difference between the two, the two are added and averaged, and the resultant average value is written onto the memory as a new value. If there is a big difference between the two, in contrast, the value previously stored in memory is used.

In step 1611, the catalyst-deterioration-level correction section 111 compares the catalyst deterioration index detected in step 1602 with a criterion value: if the catalyst deterioration index is greater than the criterion value, the catalyst deterioration judgment section 112 determines that the catalyst is deteriorated (unacceptable). If the catalyst deterioration index is equal to or smaller than the criterion value, as determined by the catalyst-deterioration-level correction section 111 in step 1611, the operation of step 1613 is executed, since the air-fuel ratio sensor downstream of the catalyst is likely to be degraded in terms of response. In step 1613, the catalyst-deterioration-level correction section 111 multiplies the catalyst deterioration index by the falling response correction value and the rising response correction value to find the final catalyst deterioration index. In step 1614, the catalyst deterioration judgment section 112 compares the final catalyst deterioration index found in step 1613 with a criterion value: if the final catalyst deterioration index is greater than the criterion value, the catalyst deterioration judgment section 112 determines that the catalyst is deteriorated (unacceptable) in step 1612. If it is determined in step 1614 by the catalyst deterioration judgment section 112 that the final catalyst deterioration index is equal to or smaller than the criterion value, the catalyst deterioration judgment section 112 determines that the catalyst is good (acceptable) in step 1615.

As described heretofore, in accordance with the embodiment of the present invention, any deteriorated catalyst can be precisely detected even if the air-fuel ratio detector downstream of the catalyst is degraded in terms of response.

What is claimed is:

1. An apparatus for diagnosing an exhaust gas purifying device used in an internal combustion engine which provides an air-fuel ratio control unit that detects the air-fuel ratio of an exhaust gas of the internal combustion engine and regulates a fuel injection amount so as to maintain the air-fuel ratio of the exhaust gas at a predetermined value, the apparatus comprising:
   a catalyst-upstream air-fuel-ratio detection means disposed upstream of a catalyst;
   a catalyst-downstream air-fuel-ratio detection means disposed downstream of the catalyst; and
   a catalyst-deterioration-level detection means for detecting a catalyst deterioration level from a relationship between the catalyst-upstream air-fuel-ratio detection means and the catalyst-downstream air-fuel-ratio detection means;
   the apparatus further comprising:
   a catalyst-deterioration-level correction means for correcting the catalyst deterioration level detected by the catalyst-deterioration-level detection means based on a falling response ratio representing the ratio between a falling response index of the catalyst-upstream air-fuel-ratio detection means and a falling response index of the catalyst-downstream air-fuel-ratio detection means or based on a rising response ratio representing the ratio between a rising response index of the catalyst-upstream air-fuel-ratio detection means and a rising response index of the catalyst-downstream air-fuel-ratio detection means; and
   a catalyst deterioration judgment means for determining that the catalyst is deteriorated based on information provided by the catalyst-deterioration-level correction means.

2. The apparatus according to claim 1, further comprising:
   a catalyst-upstream air-fuel-ratio falling-response-index detection means for detecting the falling response index of the catalyst-upstream air-fuel-ratio detection means;
   a catalyst-downstream air-fuel-ratio falling-response-index detection means for detecting the falling response index of the catalyst-downstream air-fuel-ratio detection means;
   an air-fuel-ratio falling-response-ratio detection means for calculating the ratio between the falling response index detected by the catalyst-upstream air-fuel-ratio falling-response-index detection means and the falling response index detected by the catalyst-downstream air-fuel-ratio falling-response-index detection means;
   a catalyst-upstream air-fuel-ratio rising-response-index detection means for detecting the rising response index of the catalyst-upstream air-fuel-ratio detection means;
   a catalyst-downstream air-fuel-ratio rising-response-index detection means for detecting the rising response index of the catalyst-downstream air-fuel-ratio detection means; and
   an air-fuel-ratio rising-response-ratio detection means for calculating the ratio between the rising response index detected by the catalyst-upstream air-fuel-ratio rising-response-index detection means and the rising response index detected by the catalyst-downstream air-fuel-ratio rising-response-index detection means.

3. The apparatus according to claim 1, wherein
   the catalyst deterioration level detection means assumes a ratio between a cross-correlation function and an autocorrelation function of the catalyst-upstream air-fuel-ratio detection means and the catalyst-downstream air-fuel-ratio detection means to be a catalyst deterioration index.

4. The apparatus according to claim 2, wherein
   the catalyst-upstream air-fuel-ratio falling-response-index detection means calculates the catalyst-upstream air-fuel-ratio falling response index by differentiating air-fuel ratio information detected from the catalyst-upstream air-fuel-ratio detection means to find a differential value, squaring the differential value if the differential value is negative, and integrating the squared differential value for a predetermined period calculated from the air-fuel ratio information detected from the catalyst-upstream air-fuel-ratio detection means.

5. The apparatus according to claim 2, wherein the catalyst-downstream air-fuel-ratio falling-response-index detection means calculates the catalyst-downstream air-fuel-ratio falling response index by differentiating air-fuel ratio information detected from the catalyst-downstream air-fuel-ratio detection means to find a differential value, squaring the differential value if the differential value is negative, and integrating the squared differential value for a predetermined period calculated from air-fuel ratio information detected from the catalyst-upstream air-fuel-ratio detection means.

6. The apparatus according to claim 2, wherein the catalyst-upstream air-fuel-ratio rising-response-index detection means calculates the catalyst-upstream air-fuel-ratio rising response index by differentiating air-fuel ratio information detected from the catalyst-upstream air-fuel-ratio detection means to find a differential value, squaring the differential value if the differential value is positive, and integrating the squared differential value for a predetermined period calculated from the air-fuel ratio information detected from the catalyst-upstream air-fuel-ratio detection means.

7. The apparatus according to claim 2, wherein the catalyst-downstream air-fuel-ratio rising-response-index detection means calculates the catalyst-downstream air-fuel-ratio rising response index by differentiating air-fuel ratio information detected from the catalyst-downstream air-fuel-ratio detection means to find a differential value, squaring the differential value if the differential value is positive, and integrating the squared differential value for a predetermined period calculated from air-fuel ratio information detected from the catalyst-upstream air-fuel-ratio detection means.

8. The apparatus according to claim 1, wherein:
the catalyst-deterioration-level correction means calculates a falling response correction value from the falling response ratio using a describing function and calculates a final deterioration index by multiplying the catalyst deterioration index by the falling response correction value;
the catalyst-deterioration-level correction means further calculates a rising response correction value from the rising response ratio using a describing function and calculates a final deterioration index by multiplying the catalyst deterioration index by the rising response correction value; and
the catalyst deterioration judgment means compares the final catalyst deterioration index with a criterion value to determine whether the catalyst is deteriorated.

9. The apparatus according to claim 1, further comprising a catalyst diagnosis permission means for enabling a catalyst diagnosis based on various operating conditions, wherein
the catalyst diagnosis permission means enables the catalyst diagnosis when the speed of the internal combustion engine falls within a predetermined range, the load of the internal combustion engine falls within a predetermined range, the vehicle speed is a predetermined value or more, the coolant temperature is a predetermined value or more, the air-fuel ratio is under feedback control, the catalyst is sufficiently activated, and all sensors and the like are normal.

* * * * *